(12) United States Patent
Jabaud et al.

(10) Patent No.: US 8,121,608 B2
(45) Date of Patent: Feb. 21, 2012

(54) METHOD FOR DYNAMICALLY MONITORING A GROUP OF MOBILE ENTITIES

(75) Inventors: Philippe Jabaud, Nozay (FR); Gérard Burnside, Nozay (FR)

(73) Assignee: Alcatel Lucent, Paris (FR)

( * ) Notice: Subject to any disclaimer, the term of this patent is extended or adjusted under 35 U.S.C. 154(b) by 566 days.

(21) Appl. No.: 12/335,955

(22) Filed: Dec. 16, 2008

(65) Prior Publication Data
US 2009/0156244 A1 Jun. 18, 2009

(30) Foreign Application Priority Data
Dec. 17, 2007 (FR) ...................................... 07 08789

(51) Int. Cl.
*H04W 72/00* (2009.01)
(52) U.S. Cl. ........................................ 455/453; 455/517
(58) Field of Classification Search .................. 455/453, 455/517–519, 41.2
See application file for complete search history.

(56) References Cited

U.S. PATENT DOCUMENTS

| | | | | |
|---|---|---|---|---|
| 7,069,016 | B2 * | 6/2006 | Crisler et al. ................. | 455/453 |
| 7,353,034 | B2 * | 4/2008 | Haney ............................ | 455/457 |
| 7,636,339 | B2 * | 12/2009 | Shaffer et al. ................. | 370/338 |
| 2007/0008150 | A1 | 1/2007 | Hassell | |
| 2007/0263647 | A1 | 11/2007 | Shorty et al. | |

FOREIGN PATENT DOCUMENTS

| | | |
|---|---|---|
| WO | WO 2005/009067 A1 | 1/2005 |
| WO | WO 2005/091573 A1 | 9/2005 |

OTHER PUBLICATIONS

French Search Report.
Francoise Sailhan et al., "Wireless Mesh Network Monitoring: Design, Implementation and Experiments," Globecom Workshops, 2007, IEEE, PI, XP031207096 pp. 1-6. Nov. 1, 2007.

* cited by examiner

*Primary Examiner* — Brian Young
(74) *Attorney, Agent, or Firm* — Fay Sharpe LLP

(57) ABSTRACT

A method for dynamically monitoring a group of wirelessly communicating mobile entities, characterized in that it comprises:
assigning each entity a unique identifier;
saving within a referring entity the list of the identifiers of all of the entities in the group;
determining, for each entity, a vicinity with a predetermined radius;
repeatedly, for each entity in the group:
  detecting the other entities located in its vicinity;
  transmitting a message to the detecting entities, said message containing at least the identifier of the entity, to be relayed to the referring entity;
collecting, within the referring entity, the messages relayed to it;
creating a list of identifiers contained within the messages;
comparing this list to the saved list;
if the lists are identical, determining the cohesive group;
otherwise, determining the non-cohesive group.

20 Claims, 3 Drawing Sheets

METHOD FOR DYNAMICALLY MONITORING A GROUP OF MOBILE ENTITIES

The invention deals with the monitoring of groups of mobile entities communicating wirelessly.

It is common for a group of mobile entities communicating wirelessly to spontaneously constitute itself into a wireless private area network (WPAN), also known as a mobile ad hoc network (MANet), which has the particular quality of not relying upon a pre-existing infrastructure. Among them are groups of people each equipped with a short-range (and therefore less power-consuming) radio sender/receiver operating, for example, based on the protocols defined in the IEEE 802.15 standard, such as the 802.15.1 (BlueTooth) or 802.15.4 (ZigBee) protocols.

Given the potentially fleeting nature of this sort of network, it seems necessary to ensure that it is subjected to dynamic surveillance, particularly to maintain its consistency, without which the network may become divided into multiple subgroups which can no longer communicate with one another.

A solution has been disclosed to mitigate this major drawback of mobile ad hoc networks. In this solution, described in the international patent application PCT No. WO 2005/009067 (Ericsson), a mobile terminal, within a group of mobile terminals, is defined as a reference point, and a maximum distance from this point, which all terminals of the group must fall within, is also defined. The actual distance between each terminal of the group and a reference point is measured, and an alert signal is sent when this distance exceeds the maximum distance.

This solution is only satisfactory for certain compact topologies of mobile entity groups. This is because it assumes that the reference point is located at the center of the group, which imposes a topological restriction on the group, which, for some applications, is not necessarily suitable.

A group may wish to maintain its consistency without necessarily being centered around a reference point. This is true for a column of soldiers marching in single file, where it is desired that their cohesiveness be maintained so as to avoid losing one or more laggards. By selecting the highest-ranking soldier, who is generally located at the front of the column, as a logical reference point, it is materially impossible to apply the solution proposed by the Ericsson document when using low-range terminals (such as Bluetooth or Zigbee).

The intention intends to mitigate the aforementioned drawbacks, by proposing a method for dynamically monitoring groups of wirelessly communicating entities that makes it possible to monitor the consistency of the group in a simple and reliable matter.

To that end, the invention discloses a method for the dynamic surveillance of a group of wirelessly communicating mobile entities, which comprises the following operations:

assigning each entity a unique identifier;
saving within a referring entity the list of the identifiers of all of the entities in the group;
determining, for each entity, a vicinity with a predetermined radius;
repeatedly, for each entity in the group:
  detecting the other entities located in its vicinity;
  transmitting a message to the detecting entities, said message containing at least the identifier of the entity, to be relayed to the referring entity;
  collecting, within the referring entity, the messages relayed to it;
  creating a list of identifiers contained within the messages;
  comparing this list to the saved list;
  if the lists are identical, determining the cohesive group;
  otherwise, declaring the group non-cohesive.

Other objects and advantages of the invention will become apparent upon examining the description given below with reference to the attached drawings, in which:

FIGS. 1 to 3 depict a group of N wirelessly communicating entities, such as Bluetooth or Zigbee radio sender/receivers, each entity equipping, for example, a member of a group of people for a dynamic monitoring of cohesiveness is required. Each entity is represented by a point in the figures.

Figure 2:
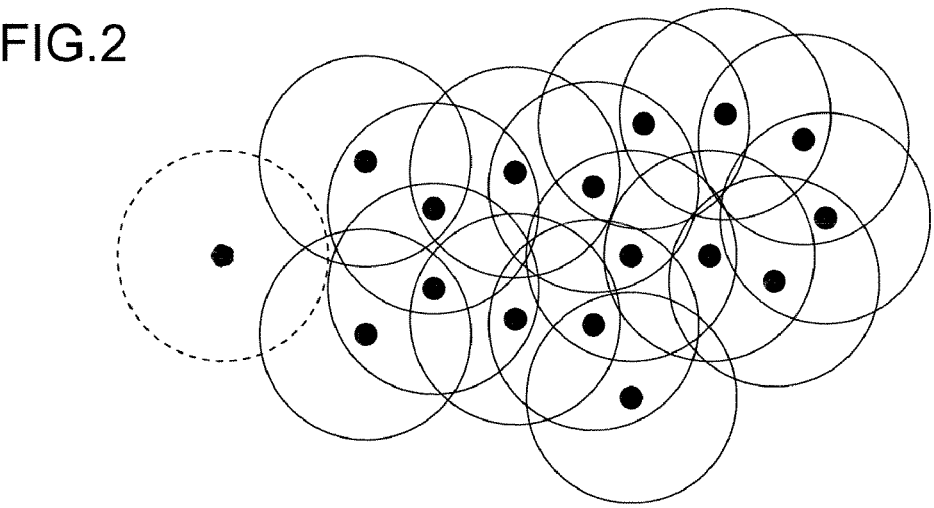
FIG. 2 is a schematic view illustrating the group of FIG. 1, made non-cohesive by the loss of an entity.
Figure 3:
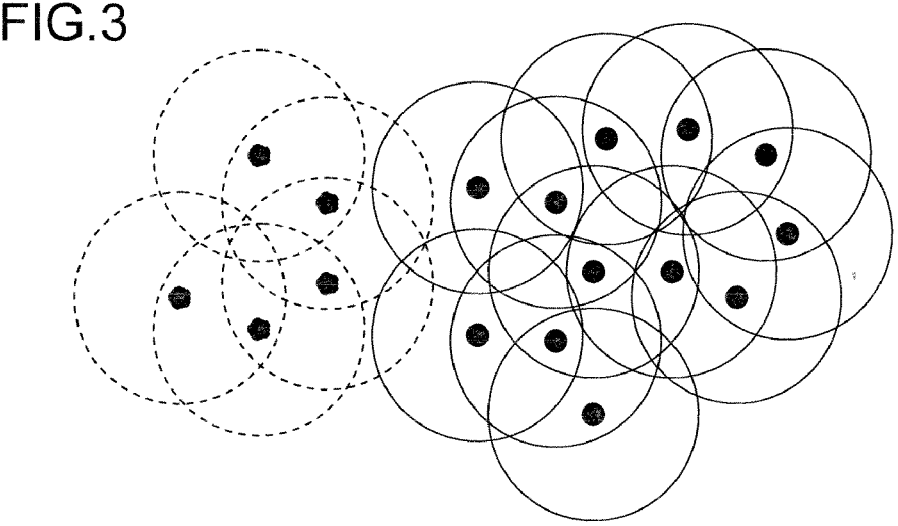
FIG. 3 is a schematic view illustrating the group of FIG. 1, made non-cohesive by the loss of a subgroup of entities.

Each mobile entity i (where $1 \leq i \leq N$) is associated with a unique identifier $ID_i$. It is assumed that each entity possesses a certain emission range, depending on the power of its radio emitter. For the purposes of monitoring the group, within this range, a virtual vicinity is defined; this is a circle with a predetermined radius R centered upon the entity i (as depicted by the circles in FIGS. 1 to 3) and included within its range.

The entities may all have a vicinity of the same radius (in such a case, R is identical for all entities), or each entity may have a vicinity whose radius $R_i$ is specific to it.

Figure 4:
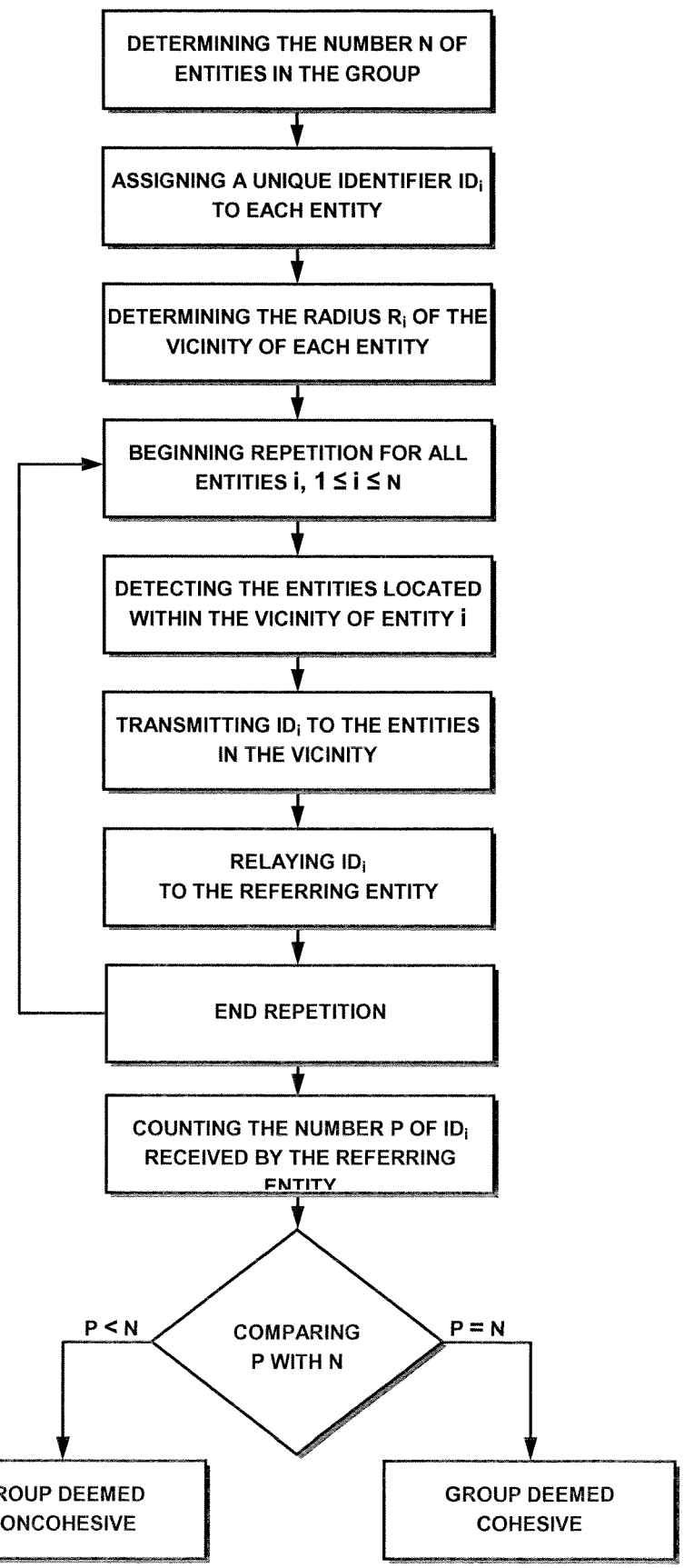
FIG. 4 is a diagram illustrating various steps of a method according to the invention.

In a first embodiment of the invention, illustrated in FIG. 4, the group of mobile entities is monitored in the following manner.

In the beginning, referring entity is defined, said entity being in charge of monitoring the group. This entity may, within a group of people, be the leader of the group (for example, an adult monitoring a group of children).

Next, the number N of entities in the group is determined. This number is saved within the referring entity. Each entity is then assigned a unique identifier $ID_i$, the list of entities (i.e. the list of identifiers) is drawn up, this list being saved within the referring entity, and the radius of the vicinity of each entity is determined.

In a recurring manner (for example, every second), for each entity i in the group, the following operations are carried out:
  entity i detects the other entities located within its vicinity;
  entity i transmits a message containing the identifier $ID_i$ to the detected entities, to be related to the referring entity.

The messages are collected by the referring entity, which creates the list of identifiers contained within all the messages and then regularly (for example, every 1.5 seconds) evaluates the cohesiveness of the group by comparing this list with the saved list.

Figure 1:
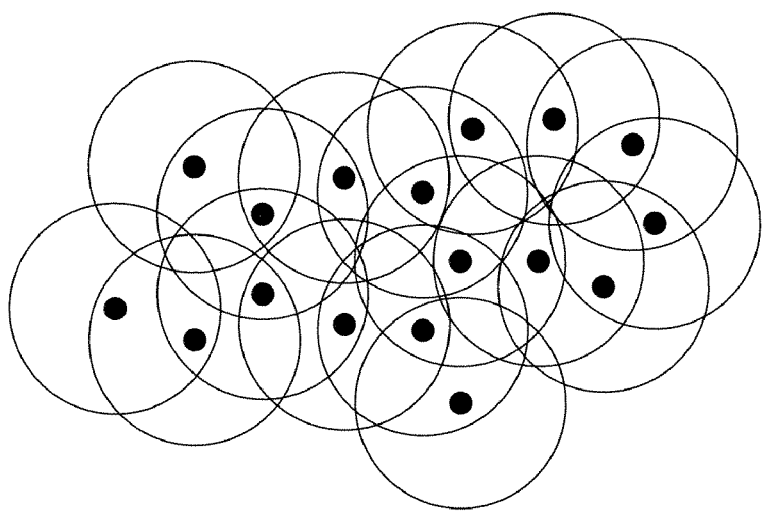
FIG. 1 is a schematic view illustrating a cohesive group of wirelessly communicating entities.

If the lists are identical, the group is deemed cohesive. This means that all of the entities were able to transmit their identifiers to the referring entity, and consequently, all of the entities are within one another's vicinity. This situation of cohesiveness is illustrated in FIG. 1.

If the lists are different, which means at least one entity is missing from the list of collected identifiers when compared to the saved list, the group is deemed non-cohesive. This means that at least one entity has no entities within its vicinity, or is not located within the vicinity of any other entity. Two non-cohesive configurations are illustrated in the drawings: a first one in FIG. 2, where an entity (whose vicinity is depicted as a dotted line) is detached from the group, and a second one in FIG. 3, with the group is split into two non-connected subgroups (the vicinities of the entities of one of these two groups being depicted as a dotted line), i.e. the vicinities of each of these subgroups include no entity of the other subgroup.

The checking of the group's cohesiveness may more simply be based on comparing the number of identifiers collected and the number of entities in the group, as initially saved within the referring entity.

If the number P of different identifiers $ID_i$ collected by the referring entity is equal to the number N of entities in the group, the group is then deemed to be cohesive.

If the number P of different identifiers collected by the referring entity is less than the number N of entities in the group, the group is deemed to be non-cohesive.

Figure 5:
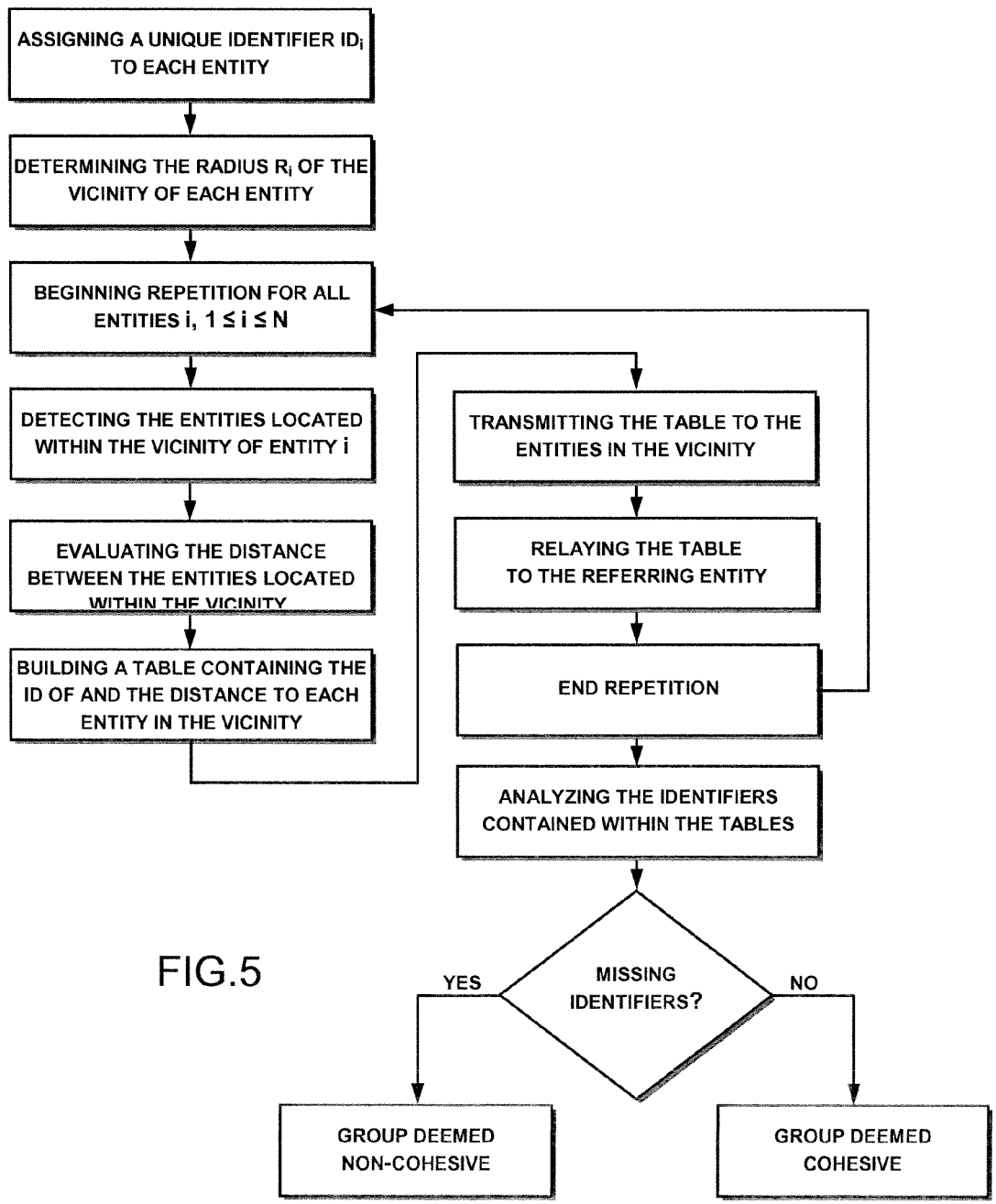
FIG. 5 is a diagram illustrating a method of monitoring a group of mobile entities according to the invention.

In a second embodiment of the invention, illustrated in FIG. 5, the group of mobile entities is monitored in the following manner.

The referring entity is defined, as indicated above. As before, the entity is then assigned a unique identifier $ID_i$, the list of entities (i.e. the list of identifiers) is drawn up, this list being saved within the referring entity, and the radius of the vicinity of each entity is determined.

In a recurring manner (for example, every second), for each entity i in the group, the following operations are carried out:
  entity i detects the other entities located within its vicinity;
  the distances separating the entity and the entities detected within its vicinity are evaluated;
  entity i transmits a message to the detected entities to be relayed to the referring entity and comprising the identifier $ID_i$ as well as a table containing the identifiers of the detected entities and the distance from the entity to them.

The messages are collected by the referring entity, which then regularly (for example, every 1.5 seconds) evaluates the cohesiveness of the group in the following manner:

The referring entity extracts the different identifiers from the collected tables, and creates a list of them. The list of the saved identifiers is compared as indicated above, with the conclusions regarding the cohesiveness of the group being drawn in the same manner.

In other words, if no identifiers are missing, all of the entities are either detected or were able to send a message to the referring entity. The group is then deemed cohesive.

On the other hand, if identifiers are missing from the collected tables, this means that an entity has become separated from the group, and either contains no other entities within its vicinity, or is not within the vicinity of any other entity. The group is then deemed non-cohesive.

Is possible to configure the issuing of an alert in the event that the group is deemed non-cohesive, in order to enable the referent (i.e., in practice, the carrier of the referring entity) to take the measures needed to make the group cohesive, such as by seeking out the missing elements of the group and incorporating them back into it. Such an alert, issued by the referring entity, may be an audio and/or visual alert.

If the group is deemed a non-cohesive, it is preferable to plan an identification of the missing entities. This identification may be carried out simply by identifying the non-received identifiers within the list of identifiers of all entities in the group, as saved within the referring entity.

It may then be provided, in order to restore cohesiveness to the group, to send to the carrier of any missing entity a message, over a channel separate from the communication performed within the ad hoc network formed by the entities of the group (for example, via a text message), in order to order it to rejoin the group. The referring entity may also identify the entities previously located within the vicinity of any missing entity, or whose vicinity previously comprised any missing entity. These entities may, for example, be alerted by the referring entity and their carriers, who are asked to seek out the missing entity (or entities) in order to incorporate it (or them) back into the group.

Additional operations may be provided for enabling more accurate monitoring of the group.

Thus, it is possible to define beforehand, for each entity of the group, a minimum quota of entities located within its vicinity. In such a case, each entity i, at the same time that it is detecting the other entities in its vicinity, repeatedly counts these entities. Next, the entity includes the number of the entities detected in this matter within its signal transmitted to the entities in its vicinity, to be relayed to the referring entity.

In this manner, the referring entity has, in addition to the number of entities actually located within the group, an additional piece of information—the number of entities and found within the vicinity at each entity—a characteristic of the group's density. In the event that density is one of the characteristics of the group which is to be monitored, and may be useful to alert the referent when this density drops below a minimum threshold, which indicates the dispersal of the group. Such an alert, issued by the referring entity, may be an audio and/or visual alert. Various degrees of alerts may be provided, depending on the density observed.

For example, a red alert may be issued if at least one entity of the group has a single entity with its vicinity; an orange alert being issued if at least one entity of the group has two other entities within its vicinity, and no alert being issued if any entity has at least three other entities within its vicinity.

Using the method described above, it is possible to dynamically monitor a group in a simple manner, without needing to centralize the sending of the presence notification within a central entity.

This method therefore enables greater flexibility for the group to be monitored, which may adopt various different topologies (for example, single-file), while maintaining its cohesiveness.

The invention claimed is:

1. A method for dynamically monitoring a group of wirelessly communicating mobile entities, characterized in that it comprises:
  assigning each entity a unique identifier;
  saving within a referring entity the list of the identifiers of all of the entities in the group;
  determining, for each entity, a vicinity with a predetermined radius;
  repeatedly, for each entity in the group:
    detecting the other entities located in its vicinity;
    transmitting a message to the detecting entities, said message containing at least the identifier of the entity, to be relayed to the referring entity;
  collecting, within the referring entity, the messages relayed to it;
  creating a list of identifiers contained within the messages;
  comparing this list to the saved list;
  if the lists are identical, determining the cohesive group;
  otherwise, determining the non-cohesive group; and
  if the group is deemed to be non-cohesive, the issuing of an alert.

2. A method according to claim 1, wherein the message transmitted by each entity to the entities in its vicinity comprises the identifiers of those entities.

3. A method according to claim 2, which comprises, for each entity, an operation of evaluating the distances separating it from the entities in its vicinity, and wherein the transmitted message comprises these distances.

4. A method according to claim 1, which comprises an operation consisting of defining, for each entity, a minimum quota of entities located with its vicinity, and for each entity, an operation of counting the number of entities detected with its vicinity.

5. A method according to 4, wherein, for each entity, the transmitted message contains the number of entities detected within its vicinity.

6. A method according to 5, which comprises an operation consisting, if for at least one of the entities of the group the number of entities detected within its vicinity is less than the minimum quota, of an operation of issuing an alert.

7. A method according to claim 1, which comprises, if the group is deemed to be non-cohesive, an operation of identifying any missing entity, for which no identifier was relayed to the referring entity.

8. A method according to claim 7, which comprises, if the group is deemed to be non-cohesive, an operation of identifying any entity previously located within the vicinity of a missing entity, or whose vicinity previously included a missing entity.

9. A method for dynamically monitoring a group of wirelessly communicating mobile entities, characterized in that it comprises:
   assigning each entity a unique identifier;
   saving within a referring entity the list of the identifiers of all of the entities in the group;
   determining, for each entity, a vicinity with a predetermined radius;
   repeatedly, for each entity in the group:
      detecting the other entities located in its vicinity;
      transmitting a message to the detecting entities, said message containing at least the identifier of the entity, to be relayed to the referring entity;
   collecting, within the referring entity, the messages relayed to it;
   creating a list of identifiers contained within the messages;
   comparing this list to the saved list;
   if the lists are identical, determining the cohesive group;
   otherwise, determining the non-cohesive group;
   wherein the message transmitted by each entity to the entities in its vicinity comprises the identifiers of those entities.

10. The method according to claim 9, which comprises, for each entity, an operation of evaluating the distances separating it from the entities in its vicinity, and wherein the transmitted message comprises these distances.

11. The method according to claim 9, which comprises an operation consisting of defining, for each entity, a minimum quota of entities located with its vicinity, and for each entity, an operation of counting the number of entities detected with its vicinity.

12. The method according to 11, wherein, for each entity, the transmitted message contains the number of entities detected within its vicinity.

13. The method according to 12, which comprises an operation consisting, if for at least one of the entities of the group the number of entities detected within its vicinity is less than the minimum quota, of an operation of issuing an alert.

14. The method according to claim 9, which comprises, if the group is deemed to be non-cohesive, an operation of identifying any missing entity, for which no identifier was relayed to the referring entity.

15. The method according to claim 14, which comprises, if the group is deemed to be non-cohesive, an operation of identifying any entity previously located within the vicinity of a missing entity, or whose vicinity previously included a missing entity.

16. A method for dynamically monitoring a group of wirelessly communicating mobile entities, characterized in that it comprises:
   assigning each entity a unique identifier;
   saving within a referring entity the list of the identifiers of all of the entities in the group;
   determining, for each entity, a vicinity with a predetermined radius;
   repeatedly, for each entity in the group:
      detecting the other entities located in its vicinity;
      transmitting a message to the detecting entities, said message containing at least the identifier of the entity, to be relayed to the referring entity;
   collecting, within the referring entity, the messages relayed to it;
   creating a list of identifiers contained within the messages;
   comparing this list to the saved list;
   if the lists are identical, determining the cohesive group;
   otherwise, determining the non-cohesive group;
   wherein, if the group is deemed to be non-cohesive, an operation of identifying any missing entity, for which no identifier was relayed to the referring entity.

17. The method according to claim 16, which comprises an operation consisting of defining, for each entity, a minimum quota of entities located with its vicinity, and for each entity, an operation of counting the number of entities detected with its vicinity.

18. The method according to 17, wherein, for each entity, the transmitted message contains he number of entities detected within its vicinity.

19. The method according to 18, which comprises an operation consisting, if for at least one of the entities of the group the number of entities detected within its vicinity is less than the minimum quota, of an operation of issuing an alert.

20. The method according to claim 16, which comprises, if the group is deemed to be non-cohesive, an operation of identifying any entity previously located within the vicinity of a missing entity, or whose vicinity previously included a missing entity.

* * * * *